Figure 1:
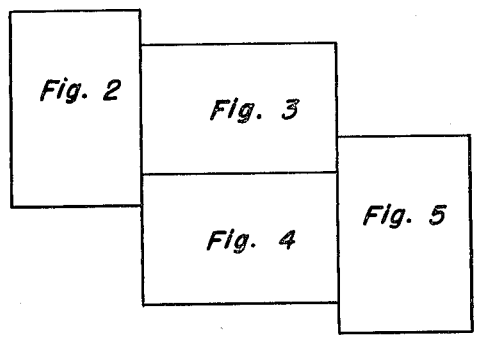

Jan. 11, 1966     K. G. HARPLE ETAL     3,229,276
HIGH SPEED MEASURING SYSTEM
Filed Dec. 8, 1960                     6 Sheets–Sheet 1

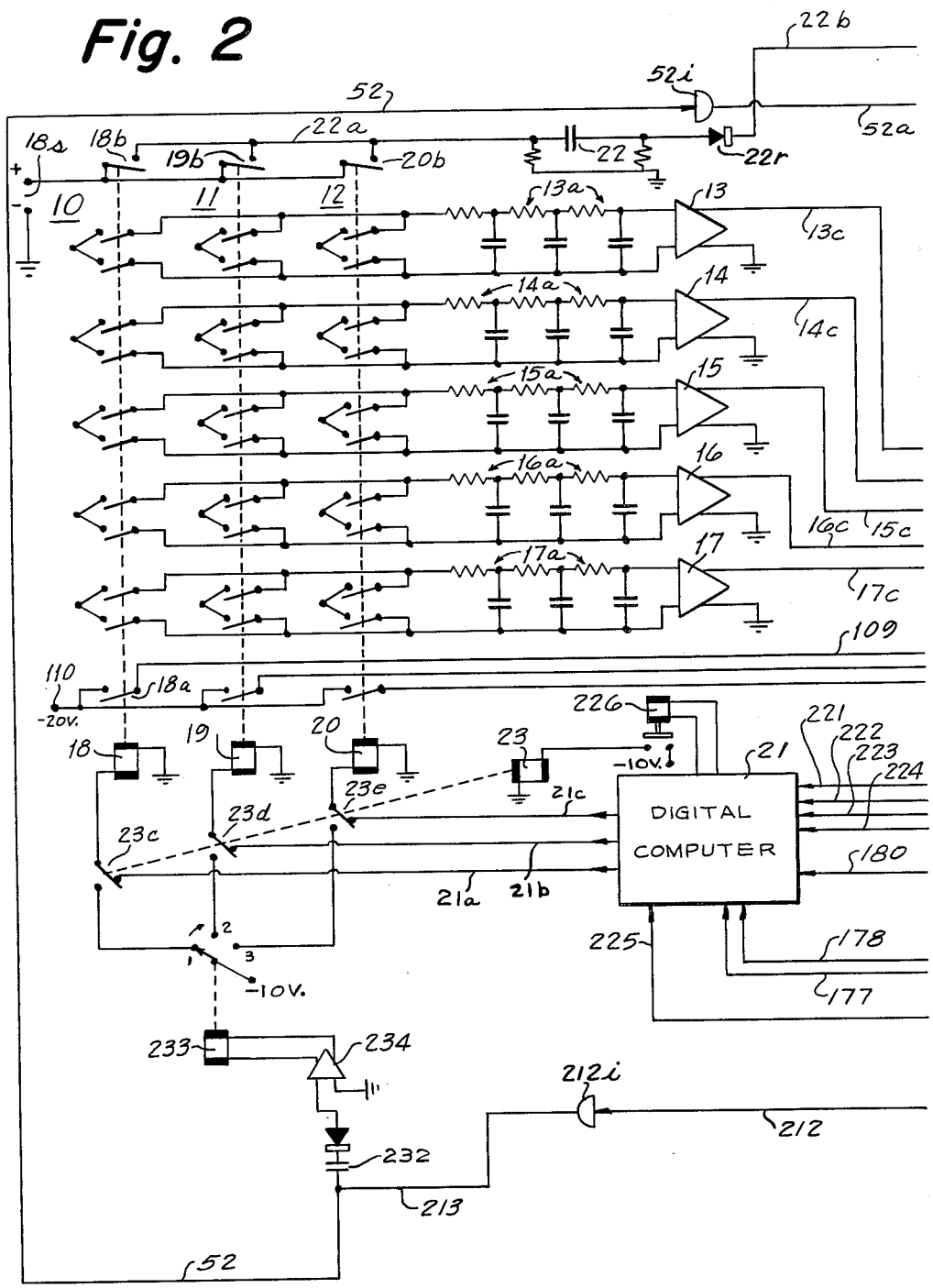

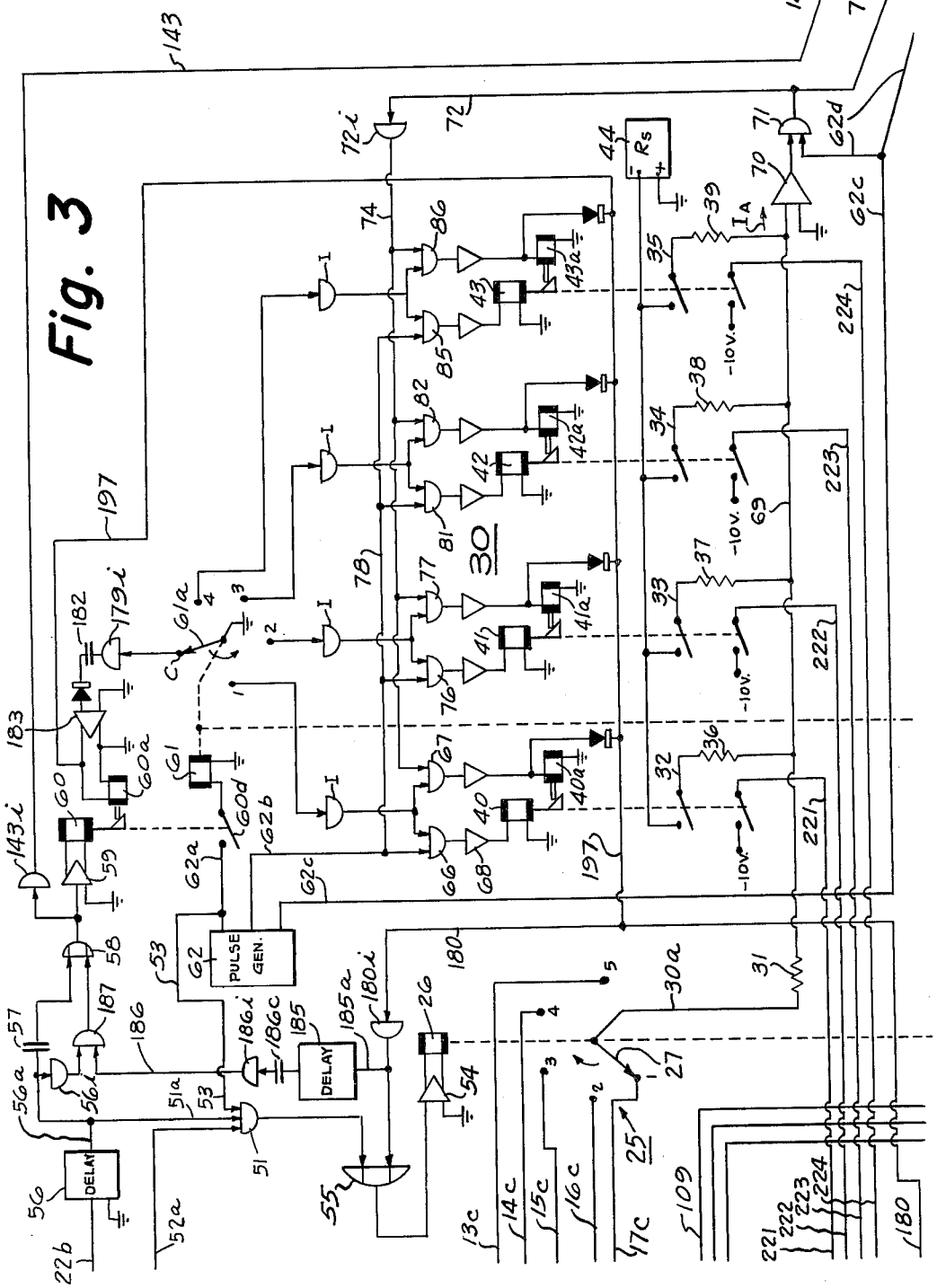

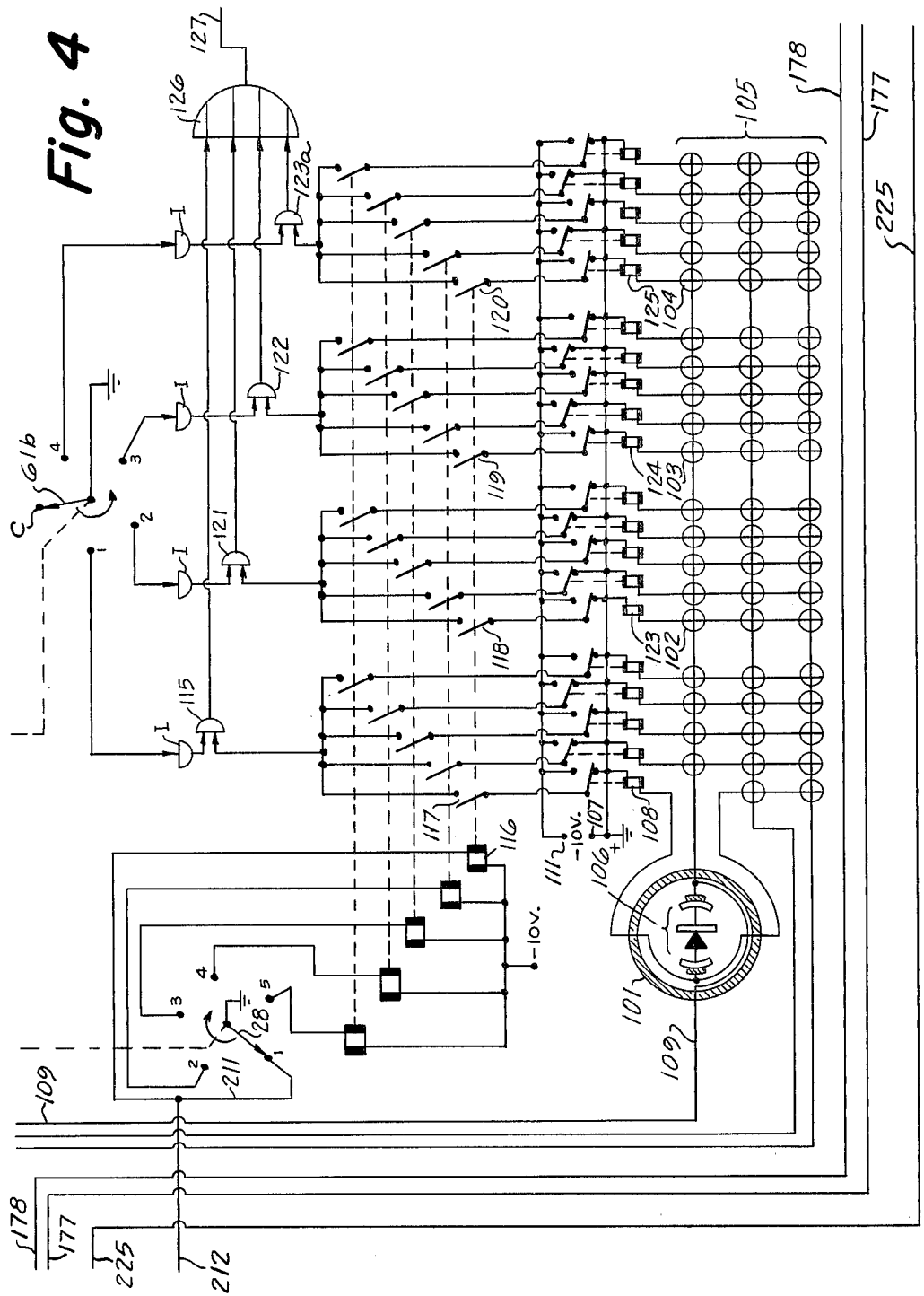

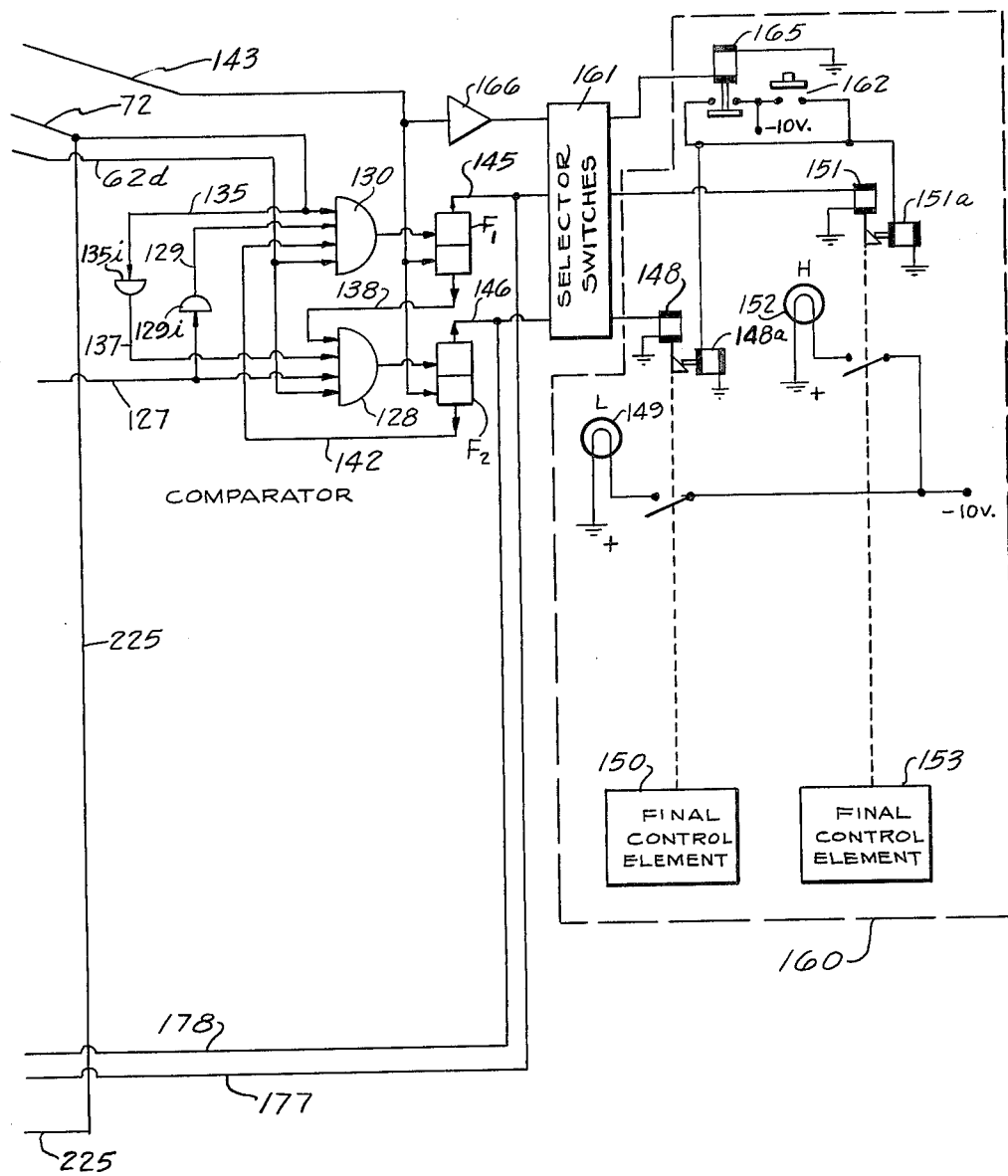

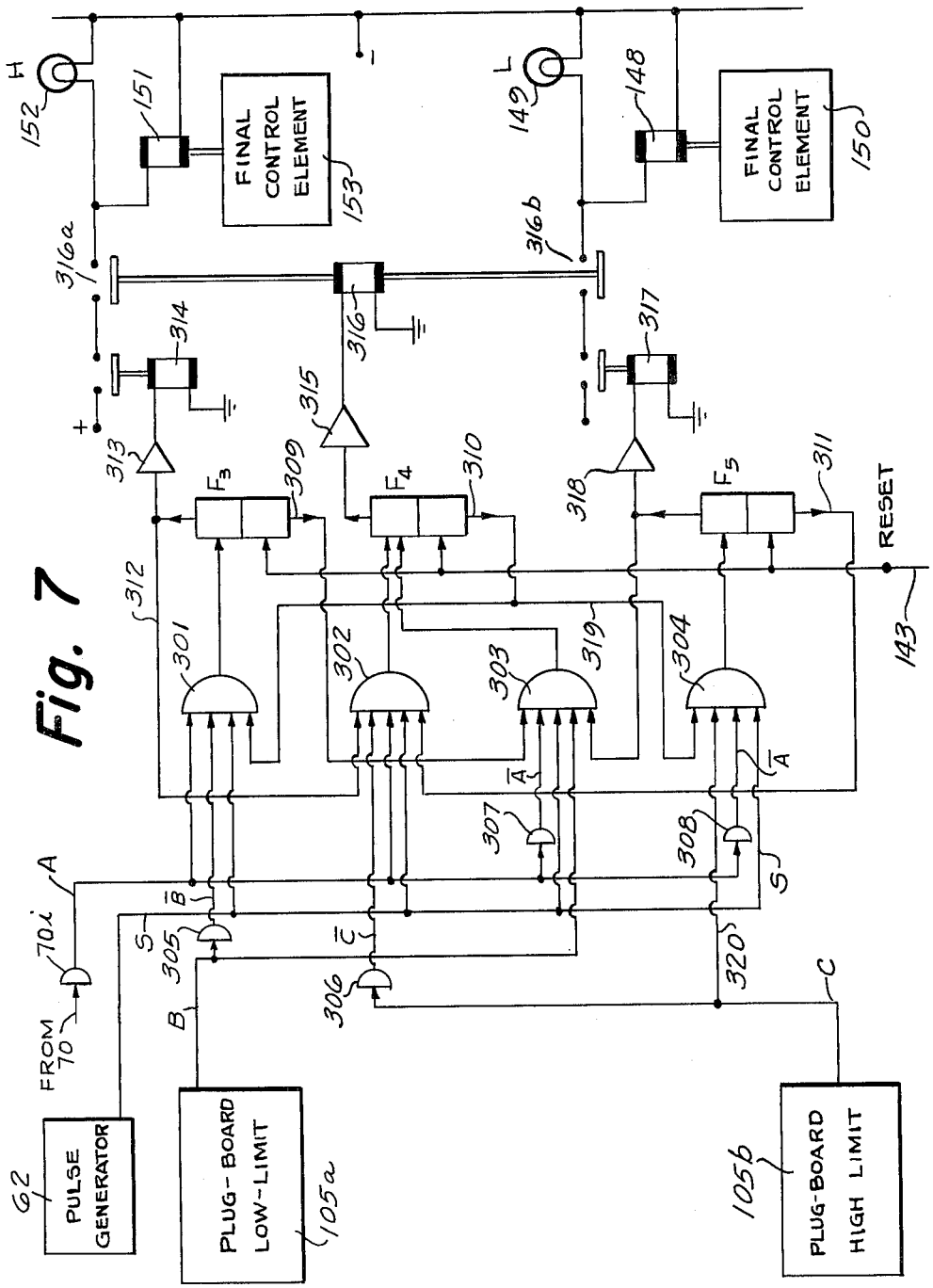

United States Patent Office 3,229,276
Patented Jan. 11, 1966

3,229,276
HIGH SPEED MEASURING SYSTEM
Kenneth G. Harple, North Wales, and Charles W. Watson, Jr., Philadelphia, Pa., assignors to Leeds and Northrup Company, Philadelphia, Pa., a corporation of Pennsylvania
Filed Dec. 8, 1960, Ser. No. 74,523
12 Claims. (Cl. 340—347)

This invention relates to high-speed measuring systems of the type particularly adapted for use in conjunction with computers and has for an object the provision of switching circuits and comparison systems by means of which high-speed operation may be attained with determination of whether or not the magnitudes of a plurality of measured variables fall within selected ranges.

High-speed measuring systems for a multiplicity of measured variables are well known to those skilled in the art. Various kinds of switching circuits have been utilized including telephone-type relays as well as vacuum tubes and transistors for accomplishing the switching functions. However, in low-level measuring systems the speed of operation has been limited in many applications by the need to include in the low-level amplifiers filters having relatively long time constants. Where the time constant is relatively long, as it must be to remove "noise," and also to provide filtering as a result of the switching of input circuits from one measured variable to another, there is required the lapse of a time interval corresponding with the time constant of each input filter before its amplifier will have been stabilized for performance of its measuring function.

In accordance with one aspect of the present invention, there are provided amplifiers in number corresponding with the number of measurements desired per unit of time where that unit of time roughly corresponds with the time constant of each input filter circuit. Having decided upon the number of measurements needed per unit of time, as, for example, per second, there will be known the number of needed amplifiers as well as the number of input circuits for the multiplicity of sensing elements, at least one for each measured variable. The number of sensing elements per input circuit is then determined by dividing the total number of sensing elements by the number of amplifiers. The result provides the number of sensing elements to be served by each input circuit to each amplifier. By suitable switching means the sensing elements are connected in groups (one element per input circuit) and successively or selectively connected to the input circuits. Thus, the sensing elements of each group, by suitable switching means, are respectively connected to the amplifiers. A high-speed scanning means then functions to derive first from one and then from the remaining amplifiers output signals representative of magnitudes of conditions. The time required to complete a cycle of scanning operations is negligible compared with the time constant of each amplifier. The output signals so obtained are then converted from their analog values to digital values comprising a selected number of digits. The digits, or the resultant binary output numbers, are compared with reference values also in digital form for the production of output signals whenever there is departure of a measured variable beyond a selected set value or beyond a predetermined upper limit or a predetermined lower limit. Whenever such departures occur selected output devices are actuated which may be in the form of alarms or control devices.

Further in accordance with the invention, there are provided means for applying to a computer the binary output of the analog-to-digital converter and for placing under the control of the computer the switching means for the input circuits. Such switching means are operated in accordance with signals appearing on address lines from the computer. However, in the event of failure of the computer or discontinuance of its operation, a further self-sequencing means is made effective to continue the operations of the measuring system so that the measured variables are continuously monitored and determinations sequentially made as to whether or not each measured variable has remained within its selected upper and lower limits. The system has considerable versatility in that the last-named self-sequencing means may have its operation interrupted by resumption of operation of the computer (or during its regular operation) with signals developed on a selected address line for operation of the switching means to produce an output from a selected measured variable as detected by a selected sensing element.

Figure 1A:
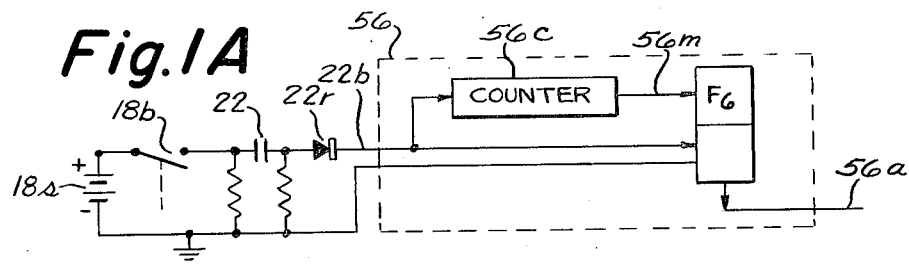
Figure 6:
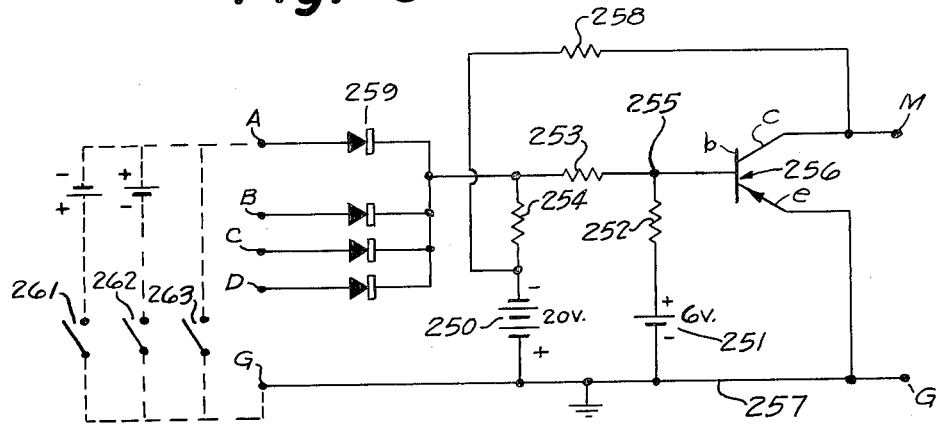

For further objects and advantages of the invention and for a discussion of additional features to which claims have been directed, reference is to be had to the following detailed description taken in conjunction with the accompanying drawings in which:

FIG. 1 illustrates how FIGS. 2–5 are to be disposed to form a complete system;
FIG. 1A is a detailed sketch of a delay means;
FIGS. 2–5 diagrammatically illustrate a single system embodying the invention;
FIG. 6 diagrammatically illustrates a logic circuit suitable for the AND, OR and inverter circuits of the gates illustrated in FIGS. 2–5; and
FIG. 7 is a wiring diagram of a modification of a signaling system by means of which signaling and control functions are related to a control band rather than to a single value.

Referring now to FIGS. 2–5, the invention in one form has been shown as applied to the sequential measurement of a plurality of magnitudes of conditions which may, of course, be measured variables of any selected kind. For convenience, the measured variable has been illustrated as temperature, and for that purpose fifteen thermocouples have been illustrated by conventional symbols and in three columns 10, 11 and 12, each including five thermocouples. The latter are to be taken as representative generically of any selected or desired type of condition-responsive devices. Though any number of rows and columns of condition-responsive elements may be utilized, for simplicity there have been illustrated in FIG. 2 only the three columns 10, 11 and 12 of thermocouples, each column having the same number (five) of thermocouples as there are amplifiers 13–17. Any of the three thermocouples of the several rows may be selectively connected to the input circuits of their associated amplifiers. More particularly, when the operating coil of the first switching device 18 is energized, the five thermocouples of the first column 10 are respectively connected to the five amplifiers 13–17. Similarly, when the coil 18 is de-energized and the coils 19 and 20 energized in sequence, the thermocouples in the second and third columns will be connected in succession to said amplifiers. The manner of controlling the energization of the relay coils 18, 19 and 20 will later be described.

Assuming that the coil 18 has been energized, it will be seen that the amplifiers 13–17 respond to the temperatures, the measured variables, of the thermocouples in the first column 10. By reason of the low-level operation, i.e, high gain of these amplifiers, it has been found highly desirable, particularly for industrial applications, that there be included in the input circuits filters 13a–17a having relatively long time constants, meaning something around a second, though, of course, it can be much less or more. However, by providing a large number of amplifiers, for example, a hundred or more, functioning in conjunction with high-speed switching means shown as a stepping switch 25, having contacts 27 (FIG. 3) and 28 (FIG. 4), operable through a number of circuit-making and closing positions in number corresponding with the number of amplifiers and during a time interval negligibly small in comparison with the time constant of the filters 13a–17a, the number of measured variables which can be read out per second will be quite high and at least equal to the number of amplifiers provided. In practice, this high-speed switching arrangement of device 25 may take the form of such devices as shown in U.S. Patent No. 2,549,401 or in the form of transistorized switching devices. For simplicity, the device 25 has been illustrated as comprising two single-pole, multiple-contact devices, having movable contacts 27 and 28, operable from one circuit-closing position to another by successive energization of an operating coil 26.

The movable scanning contact 27 of the device 25 has been illustrated in its first or "homing" position. That contact is operated sequentially through its succeeding positions to connect first, amplifier 17, and then the remaining of the amplifiers 13–16 to the input circuit 30a of an analog-to-digital converter 30. As shown, the contact 27 in its homing position connects the amplifier 17 to the input conductor 30a of the converter 30. The manner in which the device 25 is operated from one circuit-controlling position to another will hereinafter be explained. In its first, or No. 1, position, and with the coil of switch 18 energized, the amplifier 17 applies through the contact 27 and conductor 30a an output voltage to a precision resistor 31.

There will now be described the manner in which the analog voltage output from the amplifier 17 is converted to a binary digital output.

The converter 30 includes a plurality of reference circuits 32–35 in each of which there is provided one each of precision resistors 36–39. The resistors have values for flow therethrough of currents of different predetermined magnitude. The largest current will flow through the precision resistor 36 upon closure of the contacts of a switching means shown as a relay 40, the current being from a regulated source of supply 44, also designated Rs to distinguish it from other unregulated sources. Additional switching means shown as relays 41–43 perform similar functions for their associated precision resistors 37–39 which are selected in value as follows: resistor 37 will have a resistance value twice that of resistor 36; the resistance of resistor 38 will be twice that of resistor 37; and the resistance of resistor 39 will be twice that of resistor 38. By so selecting the resistance values, the current through each of them will be representative of different binary bits and each weighted in customary manner for the binary system as for example, respectively 8, 4, 2, 1, with the precision resistor 36 being representative of the most significant bit having a weighted value of 8.

In commercial embodiments of the invention, it will be understood that there will be many more bits, as many as may be desired, to achieve the precision of measurement needed for a particular application. The values of the resistance will be chosen for flow of currents of magnitude in descending order corresponding with the selected number of orders to be utilized.

To initiate the analog-to-conversion cycle, an operating coil of a relay 60 is energized after a time interval sufficiently long to permit the stabilization of amplifier 17, that is, after the expiration of a time equal to the time-constant of the input filter of that amplifier. Such a time delay is provided by a delay line 56 or other suitable delay means of conventional design.

Thus, as shown in FIG. 1A, a source of supply shown as a battery 18s is effective upon the closure of the contacts 18b to apply a positive pulse to the capacitor 22 which, through a diode 22r, applies by conductor 22b, a positive pulse to the delay means 56. This delay means which may take the form of a delay line has been shown as including a flip-flop circuit F6 which may be of the type shown in Fig. 11–4A, page 11–292, of the book entitled "Design of Transistorized Circuits for Digital Computers" by Abraham I. Pressman (1959). Such a flip-flop circuit with a positive input on the lower half thereof applies a "set" pulse and the flip-flop circuit then produces a negative output level on output conductor 56a which will be maintained until a positive pulse is applied to the upper input circuit 56m. The output conductor 56a will be connected to the collector terminal of the transistor receiving the set pulse of said Fig. 11–4A.

The delay means includes a counter 56c which receives the positive pulse at its input and after the desired time interval of say eight hundred milliseconds, produces a positive pulse for the input conductor 56m of the flip-flop F6. This will be a reset pulse. This flip-flop circuit then changes its state and the output conductor 56a then has applied to it ground potential.

The counter 56c comprises a free-running multivibrator together with the requisite number of counting stages as well understood by those skilled in the art to produce an output after the desired interval of time.

Returning now to FIGS. 2–5, the input to the delay means 56 is produced as follows. A digital computer 21 is provided with output or address lines 21a–21c upon which the computer applies output pulses of time-length (of the order of a second in one embodiment) corresponding to the period or time required for the measurement and conversion to binary values of the magnitudes of the measured variables as detected by the thermocouples of a column.

More particularly, an output applied to line 21a is applied by way of contacts 23c of a relay or switching means 23 to the operating coil of a relay or switch 18. In closing its contacts to connect the thermocouples to the amplifiers as already described, relay 18 also closes its contacts 18b to connect the positive side of source 18s to conductor 22a. Except for this control circuit, ground potential for the purposes of this application will correspond with the positive side of a source of supply as indicated by the symbol +. However, for conductor 22a there is applied thereto a positive potential. A capacitor 22, shunted by high-valued resistors, transforms the positive voltage to a positive-going pulse applied by way of diode 22r and conductor 22b to the delay means 56. The positive input to the delay means produces a negative output on conductor 56a which is maintained for an interval equal to the delay time of the delay means (of the order of 800 milliseconds in one embodiment). Thus the negative output of delay means 56 will persist for a time-interval equal or greater than the time constant of filters 13a–17a. After the expiration of the delay time, the negative output terminates with return of conductor 56a to ground potential. At the time the output of the delay means 56 is made negative, a capacitor 57 applies to an OR gate 58 a negative input pulse. As will be explained later a negative input does not change the "normal" positive output of the gate 58. The output of OR gate 58 is applied to one side of the input circuit of amplifier 59. Since the other side of its input circuit is at ground or positive potential the net input signal is zero or inadequate to produce an output. However, when a positive-going output appears at the output of the delay means 56, after the expiration of its delay time, capacitor 57 and OR gate 58 produce a negative-going input to the amplifier 59 which energizes the operating coil of a relay 60 for closure of its contacts 60d. The relay 60 is a bistable switching means shown as a relay of the latched-in-type.

The latching of contacts 60d in the closed position initiates under the control of a pulse generator 62 the conversion operations of converter 30. Before describing such operations there will be described certain other circuits as well as presented a brief description of the various gates illustrated by conventional symbols in the drawings.

Returning now to the delay means 56 and the condition of a positive input and a negative output, it will be seen that the negative output is applied by conductor 51a to an AND gate 51.

The AND gates of this application require a concurrence of negative inputs for production of a positive output. Thus the presence of a positive pulse or signal on any input of an AND gate inhibits it, that is, prevents change of its output from negative to positive. Normally the AND gate has positive or ground potential inputs. For AND gates the absence of an input signal has the same effect as a negative input signal.

In contrast with an AND gate, an OR gate has a normally positive output with normally negative inputs. Any change of any input from negative to positive changes the output from positive to negative.

The inverter has a normally positive output with a normally negative input. Thus, the inverter changes state (reverses its output) with change of polarity of its input signal.

A preferred logic circuit suitable for the performance of the AND, OR and inverter functions just described has been illustrated in FIG. 6 and will later be described in detail.

From the foregoing it will be seen that the negative output from delay means 56 applied by conductor 51a to AND gate 51 partially enables it. Its left-hand input connected to conductor 52a has applied thereto a positive input; hence AND gate 51 is inhibited and is ineffective to pass negative-going pulses from pulse generator 63 applied by way of conductor 53 as a third input. The inhibiting positive pulse is produced by an inverter 51i interposed between conductors 52 and 52a. Conductor 52 has a negative potential developed by an inverter 212i. The conductor 211 by reason of its connection to movable contact 28 in its No. 1 or homing position applies by way of conductors 211 and 212 ground or a positive input to the inverter 212i, thus producing its described negative output.

It is to be noted that with contact 28 in any of its other (2 to 5) positions, there will be an absence of an input signal to inverter 212i. Hence, its output will be positive and by action of the inverter 52i the AND gate 51 will be enabled. While delay means 56 has a negative output, pulses from generator 62 will then bring contacts 27 and 28 to their No. 1 or homing position.

Returning now to the expiration of the delay time of the delay means 56, there will be produced on output conductor 56a a resultant ground potential level. This ground potential will persist on output conductor 56a until there is again applied to the delay means 56 a positive input pulse to produce the above described negative output. As will later be explained, a further input pulse to delay means 56 will be applied thereto in a relatively short time interval (in one embodiment of the invention after the expiration of an interval of about two hundred milliseconds). As the output from delay means 56 on conductor 56a changes from its negative output to ground potential (a positive-going pulse), there is produced by way of capacitor 57 a positive output pulse which is applied to the OR gate 58. This OR gate produces a negative output and thus energizes the amplifier 59. Its output is effective to energize the coil of relay 60 for closure of its contacts 60d.

The closure of contacts 60d completes an energizing circuit from a pulse generator 62 for the operating coil of a scanning means shown as a stepping switch 61 having scanning contacts 61a (FIG. 3) and 61b (FIG. 4) operable through five different circuit-closing positions. The pulse generator produces a succession of pulses on conductor 62a with short time intervals between them, as of about 2 milliseconds.

With the contact 61a in its first position, it will be seen that there is completed a connection from ground to an inverter which thereupon applies a negative output to AND gates 66 and 67. These gates are accordingly enabled.

The AND gate 66 has its other input connected by conductor 62b to the pulse generator 62. Negative pulses about 6 milliseconds apart are applied to output conductor 62b and follow by about 2 milliseconds the pulses delivered by way of conductor 62a. Upon production of a negative pulse on conductor 62b there appears a positive output from AND circuit 66. The amplifier 68 responsive to this positive pulse thereupon energizes the coil of a relay 40, of the latched-in type, to close its normally open contacts. It is in this manner that the relay 40 is effective after a time interval to apply a fixed potential from a regulated source 44 to a precision resistor 36. The resistor 36 may have a value of 15,000 ohms for flow of current therethrough of one milliampere for a regulated source of 15 volts. When, for full-scale or maximum output of the thermocouples each of the amplifiers 13–17 produces an output of say five volts, then the resistor 31 may have a value of 2500 ohms. Thus, for full-scale output, there can flow from an amplifier through resistor 31 a current of two milliamperes. When an amplifier responds to an input corresponding with half scale, then a current of one milliampere can flow through precision resistor 31 and it will thus be equal to the current flowing through the precision resistor 36. In this case, all of the current through resistor 31 will also flow through resistor 36 and there will be no current as indicated by the arrow $I_A$ flowing to or from a comparison amplifier 70. The amplifier 70 is of the type having a low impedance input circuit (very low compared with the lowest values of the precision resistors 36–39). Accordingly, the amplifier 70 will have zero output. Stated differently, with zero current $I_A$ at the input of the comparison amplifier 70 the output of the amplifier will be at ground potential.

When the current through resistor 31 exceeds the current through resistor 36, the difference current flows by way of conductor 69 into the amplifier 70. Flow of current into the amplifier 70 by way of conductor 69 does not produce an output from the amplifier.

If the current through the resistor 31 be less than that through the resistor 36, the current $I_A$ flowing through the input circuit of comparison amplifier 70 reverses in direction, and this reversal causes an output to be developed by the amplifier 70. That output will be a negative voltage applied to AND circuit 71.

Assuming now that the current through resistor 31 produced by the voltage output from amplifier 17 is less than that through resistor 36, it will be remembered that a negative output is applied to the AND circuit 71. A succession of negative pulses are produced by the pulse generator 62 and applied by way of conductors 62c and 62d to the AND circuit 71. These pulses are spaced about six milliseconds apart and follow the pulses on line 62b by about two milliseconds. Upon arrival of a negative pulse on AND gate 71, that gate produces a positive output pulse which in its passage through an inverter circuit in conductor 72 is transmitted as a negative pulse by way of conductor 74 to one of the inputs of the AND circuit 67. It will be recalled that the other input to this AND circuit 67 has been energized from the inverter I in circuit with contact 61a, that contact 61a then being in its first position. Accordingly, the negative pulse applied to the AND circuit 67 produces a flow of current through the tripping coil 40a of the relay 40. This relay is tripped to its open and illustrated position.

It is again noted that the multi-point stepping switch 61 with scanning contacts 61a and 61b represents a scanning device. That device now completes in succession the remaining circuits associated with its remaining contacts 2, 3, 4 and C. More particularly, after a time interval of about six milliseconds, sufficient for the foregoing operations of the relay 40 to take place, a second pulse is delivered by the pulse generator 62 by way of conductor 62a to energize the coil of stepping switch 61 to move the scanning contacts 61a and 61b to their second or No. 2 positions. The AND circuits 76 and 77 have applied to their inputs through the inverter enabling potentials preparing them for operation. A second negative pulse from the pulse generator 62 is applied by way of conductors 62b and 78 to the AND gate 76. The positive pulse from AND gate 76 is amplified for operation of relay 41 which is then energized and latched into position. The closing of the contacts by the relay 41 connects the precision resistor 37 to the regulated source 44.

Since the precision resistor 37 has a value twice that of the resistor 36, only half the current will flow therethrough which previously flow through resistor 36. For the comparison made with the current flowing through resistor 36, it will be remembered that the current flowing through resistor 31 was assumed to be less than that through resistor 36.

It will now be assumed that the current flowing through resistor 31 exceeds that flowing through the precision resistor 37. As explained above, when this condition occurs, the difference current $I_A$ will be flowing away from the amplifier 70 and hence that amplifier will have zero output (corresponding with ground potential). Hence, the AND circuit 71, at the time the pulse generator 62 applies to it a second pulse by way of conductors 62c and 62d, will have a negative output. This negative output through the inverter applies a positive pulse by way of conductors 74 to the AND circuit 77. Since there is one positive input and one negative input, the AND circuit 77 maintains its negative output. The amplifier does not respond and the relay 41 remains in its latched position.

Thus, while the relay 40 was unlatched and operated to its open position which may be taken as corresponding with a binary zero, the relay 41 remains in its latched position to be representative of a binary one.

Assuming now that a third pulse is delivered by the generator 62 by way of conductor 62a to the stepping coil of stepping switch 61, the scanning contacts 61a and 61b will be operated to their third positions to apply to AND circuits 81 and 82 enabling potentials. A third pulse from generator 62 applied by conductors 62b and 78 to AND circuit 81 energizes by way of the amplifier the relay 42 for application from the regulated source 44 of its fixed voltage to the precision resistor 38. This resistor has a value twice that of the resistor 37.

The comparison amplifier 70 now responds to a direction of flow of current determined as follows: since the relay 41 is in its latched-in position, a part of the current from resistor 31 flows through resistor 37. The resultant difference current is compared with the current flowing through the resistor 38. If the difference current be less than the current through resistor 38, then the current will flow toward and into the comparison amplifier 70, and it will have a negative output.

When the pulse generator 62 produces a third negative output pulse applied by way of conductors 62c and 62d to AND circuit 71, the latter will produce by way of the inverter a negative pulse. This pulse is applied by conductor 74 to the AND circuit 82 for energization of the amplifier with a positive pulse which then energizes the tripping coil 42a to unlatch the relay 42. That relay then operates to its illustrated open position.

Thus far the relays 40 and 42 are in their unlatched positions, while the relay 41 remains in its energized or latched position. Thus in the binary system, the positions of the relays may be taken to represent the binary number 0 1 0.

It is again emphasized that there will be many such devices generally in the form of bistable semi-conductor circuits which are either on or off, dependent upon whether they are to represent zeros or ones in the binary system and that the number of such circuits or switching devices used will be that needed to provide the necessary precision in the measurement. For simplicity, only four such devices have been shown in the form of the relays 40–43.

The final, or No. 4, scanning positions of contacts 61a and 61b take place upon delivery by way of conductor 62a from the pulse generator 60 of a fourth pulse which again energizes the coil of stepping switch 61. The contact 61a in its fourth position applies an enabling potential to AND circuits 85 and 86. A subsequent pulse from generator 60 applied by way of conductors 62b and 78 to AND circuit 85 energizes the operating coil of relay 43 to close its circuit and to apply the regulated potential from source 44 to the precision resistor 39 which has a resistance value twice that of resistor 38. It will be assumed that the difference current (the current through resistor 31 less that through resistor 37) is equal to or greater than the current through resistor 39. For this condition, the output of comparison amplifier 70 will be zero. There will be a negative output which by the inverter produces a resultant positive pulse on conductor 74 which is applied to the AND circuit 86. Accordingly, it is ineffective to produce energization of the tripping coil 43a. Consequently, the relay 43 will remain in its latched position and will be indicative of a one in the binary system. Thus, the magnitude of the measured variable, the temperature of the lowermost thermocouple in column 10, will be represented by the binary number 0 1 0 1.

In the foregoing description it will be noted that each pair of AND gates associated with positions 1–4 of movable scanning contact 61a are enabled with that contact in a given position. Thus in its illustrated position, the several inverters connected to the numbered contact positions have open input circuits and produce positive outputs which block or inhibit operation of all of AND circuits 66–67, 76–77, 81–82 and 85–86.

There will now be described the manner in which the magnitude of the measured variable is compared with a predetermined value and also how there are produced, as may be desired, output signals when the measured value departs from its pre-selected value. These output signals may be used to energize alarm circuits and also they may be used to control the operation of final control elements arranged to perform control functions which vary the magnitudes of the measured variables in directions to return them to their pre-selected values.

The comparison operations now to be described take place concurrently with the conversion of the analog outputs to digital outputs as will be evident from the fact that there has not yet been described the functions performed by operation of scanning contact 61b during its operation through its five positions.

It will be assumed that the reference value for the measured variable of the lowermost thermocouple in column 10 in the binary system will be 1 0 1 1. To establish this number in a plug-in board 105, there will be inserted plug-in devices in plug-in receptacles where a one is to be represented. Thus, for the lowermost thermocouple of column 10, there will be a plug-in device in each of the receptacles 101, 103 and 104. One of the devices 106 will not be inserted in the receptacle 102 so that the absence of a device 106 from receptacle 102 will be indicative of the binary digit zero. Only the device 106 and the receptacle 101 have been illustrated in detail.

When the device 106 is inserted in receptacle 101, a circuit is completed between the unshaded contacts of device 106 and the cross-sectional stationary contacts of receptacle 101 for flow of current through a diode connected between the unshaded contacts. This current flows from a source of which the positive terminal 107 is at ground potential, and by way of an operating coil of a relay 108 to a stationary contact, thence through a movable contact and the diode of device 106, the other movable and stationary contacts and by way of conductor 109 and contacts 18a to the negative terminal 110 of the source of supply labelled minus twenty volts. The relay 108 is thereupon energized to close its contacts, thus partially to complete from the negative side (minus ten volts)

of a source of supply 111 an enabling circuit for an AND gate 115. This circuit with the selector contact 28 in its first, or No. 1, position will be completed since the contact 28 has completed an energizing circuit for the operating coil 116 of a relay which is effective to close the contacts 117 in series with the contacts of relay 108.

It is to be observed that the relay 116 has additional contacts 118, 119 and 120 which are concurrently closed partially to complete enabling circuits for AND circuits 121, 122 and 123. Since there have been inserted in receptacles 103, 104 device 106, the operating coils of relays 124 and 125 will be energized to complete the application to AND circuits 122 and 123 of enabling potentials from source 111.

In its first or No. 1 position, the scanning contact 61b applies through an inverter to the AND circuit 115 a negative potential. Its resultant positive output is transmitted to an OR circuit 126, and from that circuit a negative pulse is transmitted by way of conductor 127 to an AND circuit 128, and by way of an inverter 129i and conductor 129 as a positive pulse to a further AND circuit 130.

Returning now to the assumption in the example described above, it will be seen that the most significant digit of the binary number 0 1 0 1 resulting from a comparison between the currents through resistors 31 and 36 is a "zero." At the time of producing that "zero," amplifier 70 had a negative output, thus producing at the AND circuit 71 a positive output. This positive output is applied by way of conductors 72 and 135 to AND gate 130. The positive pulse through an inverter 135i applies by way of conductor 137 a negative pulse to the second input of AND gate 128. The AND gate 128 has a negative potential applied to a third input by way of conductor 138 from the output of a bistable flip-flop device $F_1$. A second bistable flip-flop device $F_2$ applies by way of its output conductor 142 a negative pulse to the AND gate 130.

The bistable flip-flop devices 140 and 141 are set to their foregoing described states by earlier application to their lowermost input circuits of a pulse by way of conductor 143 derived from an inverter 143i connected to the output of the OR gate 58.

It will be remembered that there is an output from the OR gate 58 since that output energized relay 60 to initiate the scanning operations above described. Thus, at the beginning of the scanning operations the bistable devices $F_1$ and $F_2$ were reset to provide negative outputs for their output conductors 138 and 142 and, incidentally, to assure the lack of outputs at their other output conductors 145 and 146. The latter outputs are utilized for alarms and control purposes as will later be set forth.

Since the AND gate 128 now has enabling pulses applied to three of its four inputs, it will produce a positive output as soon as the pulse generator 62 generates a negative pulse applied by way of conductors 62c to that fourth input. As this pulse arrives, the AND gate 128 produces a positive output pulse applied to the bistable device $F_2$. This device then produces an output by way of conductor 146 which through selector switching means 161 is applied to the operating coil of a relay device 148 of the latching type. The closure of its contacts energizes a low-level alarm device shown as a signal lamp 149. The relay 148 may also operate a final control element 150 in a direction to increase the temperature to which the lowermost thermocouple of column 10 is responsive since the indication thus far developed shows that the most significant digit of the measured variable is below the value it should be and as preselected by the presence in receptacle 101 of plug-in device 106.

Inasmuch as it is now known that the measured variable is below its desired value, the relative magnitudes of the remaining digits become unimportant. Accordingly, when the bistable device $F_2$ is switched to its opposite state (negative output on 146, positive output on 142), there is applied by conductor 142 a positive pulse to the AND circuit 130. This positive pulse is effective to inhibit the operation of AND circuit 130 notwithstanding the concurrence of other negative inputs.

In summary, as soon as one or the other of bistable devices $F_2$ and $F_1$ is switched by reason of the transmittal by way of one of the AND circuits 128 and 130 of a switching pulse, the remaining AND circuit is inhibited against further operation during the completion of the scanning operations performed by scanning contacts 61a and 61b. It will be understood that scanning operation takes place by energization of the operating coil of the stepping switching device 61 under the control of the pulse generator 62. Inasmuch as the continuance of the scanning operation does not affect the final signaling means or the final control elements, a description of the events which take place upon the completion of the scanning operation will be postponed, except to say that the bistable device $F_2$ will be reset by a pulse delivered thereto by way of conductor 143 and generated in a manner already described.

Remembering that the predetermined magnitude of the condition, the set value, which was established at the plug-in board 105 comprises the binary number 1 0 1 1, there will now be described the operations of the converter 30 including its scanning device shown as a stepping switch 61 and the comparator for a situation where the magnitude of the controlled variable as indicated by the lower-most thermocouple in column 10 has a value corresponding with a binary number of 1 1 0 1 which, of course, is greater than 1 0 1 1. Under the assumed condition and with the scanning contacts 61a and 61b again in their first or No. 1 positions, the current through the input resistor 31 will exceed the current through resistor 36. Accordingly, the difference current $I_A$ will be flowing toward the amplifier 70 and thus produces a positive output. The AND gate 71 is inhibited. Its output remains negative, and the continuing positive output from the inverter is applied by way of conductor 74 to the AND gate 67 to inhibit its operation and to prevent energization of the tripping coil 40a of the relay 40. Thus, this relay is latched into position. The negative output from the AND gate 71 applied by way of conductor 72 to the AND gate 130, and by way of conductor 135 and the inverter 135i as a positive pulse is applied by conductor 137 to inhibit the operation of the AND gate 128. Thus, it will be seen that the AND gate 128 is inhibited from passing a pulse, whereas in the previously assumed conditions the output from the amplifier 70 produced a negative pulse from AND gate 71 which enabled the gate 128 and inhibited the operation of the gate 130.

Though the pulse applied by way of the comparison amplifier 70 and the AND gate 71 is in the enabling direction in respect to the AND gate 130, that gate is nevertheless inhibited in its operation by reason of the output derived from the "reference value" or plug-in board 105. It will be recalled that with relay 108 energized, the voltage derived by way of the switch 117 from terminal 111 is negative, at the output of AND circuit 115 is positive, one output conductor 127 from OR gate 126 is negative, and positive on conductor 129 leading from the inverter 129i to AND gate 130. It is this positive pulse that inhibits the operation of AND gate 130.

Summarizing, when the most significant digit in the binary number is a "one" and the corresponding digit is a "one" as set in the plug-in board 105, it has not yet been determined whether the measured variable is above or below its desired value. Accordingly, both AND circuits 128 and 130 in the comparator are inhibited from operation, and neither alarm can function.

Assuming now that scanning contacts 61a and 61b have been operated to their No. 2 positions, the next-most significant digit from the measured variable will be a "one" indicating that the value will be greater than the corresponding next-most significant digit from the plug-in board, which is a "zero." Under these conditions, the output from the amplifier 70 will be positive and, accordingly, there continues to be a negative output from AND gate 71 applied by conductor 72 to the AND circuit 130.

Since the contacts of receptacle 102 are not bridged by a plug-in device, the relay 123 remains deenergized. With contacts 118 of relay 116 closed, positive or ground potential is applied by way of the contacts of relay 123 to the AND gate 121. Its output remains at a negative potential. Accordingly, the OR gate 126 has a positive output which through the inverter 129$i$ applies by conductor 129 to the AND gate 130 a negative enabling pulse which renders the AND gate conductive as soon as there is applied to it a negative pulse by way of conductors 62$c$ and 62$d$ from the pulse generator 62 for energization of the bistable device $F_1$. This device, since its remaining input is negative, produces an output from its conductor 145 for energization of a high limit relay 151. This relay in closing its contacts energizes a signal lamp 152 and also actuates a final control element 153 in a direction to decrease the magnitude of the controlled variable. Relay 151 is also of the latched-in type.

The bistable device $F_1$, through output conductor 138, applies a positive pulse to the AND circuit 128 to inhibit it from transmitting switching pulses to the bistable device $F_2$. Thus, as soon as the higher significant digit (in this case the second one) indicates whether the controlled variable is above or below the set magnitude, the final signaling means, relay 151 and lamp 152, continue to be effective as the scanning proceeds. In some cases there may be needed a comparison between the least-significant digits to determine the direction of the difference between the magnitude of the condition and its pre-selected value. For this purpose, the operations will continue as above described.

The final signaling and switching assembly within the broken-line enclosure 160 will be duplicated one for each measured variable. Accordingly, the selector switch 161 operates for transference of the output from amplifier 166 as well as for transference of output conductors 145 and 146 to each of the several switching assemblies. Since latching relays or bistable state devices are utilized, the final control elements 150 and 153 remain energized until the controlled variable returns to its pre-selected value except for the short time interval (about 200 milliseconds) required for completion of a cycle of measurements. Thus, when a reset pulse is applied by way of the conductor 143 for the flip-flop devices $F_1$ and $F_2$, that same reset pulse is applied to the amplifier 166 which is effective through the switching device 161 to energize a relay 165 to complete, through its contacts, energizing circuits for tripping coils 148$a$ and 151$a$ of relays 148 and 151 from the minus ten volt terminal to ground or the positive terminal. Thus, the latched-in one of latching relays 148 and 151 is operated to its open position. These relays are deenergized and the signal lamps 149 and 152 extinguished just prior to the initiation of a succeeding measuring cycle. When energized, they stay energized until the completion of the measuring cycle. By this is meant the measurement of the magnitudes of all of the measured variables since switching device 161 will then be a substantial duplicate of switching devices 18–20 and 25 to connect in sequence one each of devices 160 corresponding in number to the number of thermocouples to output conductors 145, 146 and to the output of amplifier 166.

If desired, the relays 148 and 151 may be deenergized at any time by manually closing a reset switch 162, this switch thus providing for manual control.

In general, it will be preferred to provide a multiplicity of switching assemblies 160. Where they are not so provided, then relay 165 will be operated at the beginning of each scanning operation for each of the measured variables.

There has now been described the manner in which the system as a whole functions in response to two selected values for the measured variable to which the lowermost thermocouple in column 10 has responded. After the completion of the measurements for the No. 4 position, the scanning switch 61 is returned to its homing or C position. With the contacts 61$a$ and 61$b$ in their C positions, it is known that there has been completed the conversion of the analog value of the measured variable to its binary value. Accordingly, the arrival of contact 61$a$ in its C position is utilized to initiate the operation of the selector contacts 27 and 28 to their No. 2 positions, thus to connect by way of contact 27 the second thermocouple of column 10 to the amplifier 16.

To produce the stepping action, the energization of the operating coil 26 occurs in manner now to be set forth.

As contact 61$a$ arrives in its C position, ground potential is applied to an inverter 179$i$ which applies a negative output to the capacitor 182. The resulting negative pulse produces a negative output from amplifier 183 on conductor 197. The tripping coil 60$a$ is energized to open contacts 60$d$ of relay 60. This opens the circuit of the coil of relay 61 to maintain contact 61$a$ in its C position.

The negative pulse on conductor 197 is effective to produce energization of the tripping coils 40$a$–43$a$ of relays 40–43 which are then returned to their illustrated open positions.

The negative pulse on conductor 197 is applied by way of conductor 180 to an inverter 180$i$, and from its output a positive pulse is applied to the OR gate 55. The resultant negative pulse from its output produces from amplifier 54 energization of coil 26 of stepping switch 25 which thereupon operates its contacts 27 and 28 to their second or No. 2 positions.

The pulse from the inverter 180$i$ which is applied to OR gate 55 is by conductor 185$a$ applied to a delay means 185, such as shown in FIG. 1A. After a short time interval of about five milliseconds, a positive output is applied by delay means 185 to a capacitor 186$c$, and from the output of an inverter 186$i$ a negative pulse by a conductor 186 to the AND gate 187. During the time that the output from the delay means 56 is negative, it will be seen that the inverter 56$i$ will have a positive output which will inhibit AND gate 187. However, with the return of output conductor 56$a$ to ground potential, the inverter 56$i$ will have a negative output to enable the AND gate 187. Accordingly, with the application to its other input of the negative pulse from conductor 186 the AND gate 187 produces a positive output which is applied to OR gate 58 to produce a negative output pulse applied to the amplifier 59 which thereupon energizes the coil of relay 60 again to close its contacts 60$d$. The pulses from generator 62 are then applied to the coil of scanning switch 61 to step the contacts 61$a$ and 61$b$ through their several circuit-closing positions.

It will be recalled that the tripping coils 40$a$–43$a$ of relays 40–43 were energized upon the appearance of a negative pulse on conductor 197. The tripping relays need not then be energized. Such bistable devices or relays 40–43 may be reset at any time prior to the initiation of a new cycle of scanning operations, as for example, when the operating coil of switching device 60 is again energized. Thus the circuit to the tripping coils 40$a$–43$a$ may as an alternative extend from the output of the OR gate 58 directly to apply a negative potential to the diodes in series with the tripping coils 42$a$ to return the relays 40–43 to their initial and illustrated positions.

The operations above described for the lowermost thermocouple of column 10 are now repeated for the thermocouple which through amplifier 16 and contact 27 develops on conductor 30a a potential of magnitude proportional to temperature.

It is to be noted that the stepping of switch 25 occurs without the relatively long time delay interposed by the delay means 56. The delay is introduced only at the time of transfer of the amplifiers from one to another of columns 10–12 and at the beginning of that transfer cycle. The conversion of the analog values of the measured variables of the thermocouples of column 10 to digital values in the form of binary numbers proceds by repetition of the aforesaid operations.

It will be remembered that in one embodiment of the invention the measuring and converting operations require about 200 milliseconds per column. This, plus the initial 800 milliseconds, comes to a second. The computer 21 after an interval of a second or more deenergizes line 21a. The opening of contacts 18b causes the capacitor 22 to discharge. At this time, there is no change at the output of delay means 56. Any negative-going pulse to delay means 56 is blocked by diode 22r.

Shortly after coil 18 is deenergized, the computer 21 applies a control pulse to address line 21b to energize the coil of relay 19 to close its contacts to connect the thermocouples of column 12 to the amplifiers 13–17 and through closure of its contacts 19b initiates a second cycle of measuring and converting operations. Since the sequence of operations is the same as already described, it need not be repeated. It is sufficient to say that the application of the positive potential to the capacitor 22 is applied through diode 22r and conductor 22b to the delay means 56 which thereupon produces its negative output which again persists for about 800 milliseconds. The inverter 56i inhibits the AND gate 187 during the delay time of delay means 56. At the expiration of that time, the magnitudes of the conditions to which the thermocouples of the second columns respond are then measured as described above. After the measurement of the magnitudes of the conditions of the devices of column 11, the foregoing operations are repeated for the devices of column 12.

It is again emphasized that the condition-responsive devices shown as thermocouples may include devices of other kinds, such for example, as the measurement of pH, pressure, and other variables needed to control complicated electrical, mechanical and chemical processes. Where such measured variables are utilized in equations and otherwise for the production of outputs used for control and study or otherwise, the computer 21 may by suitable programming thereof interrupt the orderly progression of measurement as set forth above. The system thus far described has adequate versatility to accommodate the last-named requirements. A single example will suffice to demonstrate that versatility.

It will be assumed that the middle thermocouple of column 10 has been connected to amplifier 15, and that measurements are under way as above described. At the time the scanning contacts 61a and 61b have been operated to their C positions, it will be further assumed that the computer 21 deenergizes the coil of relay 18 and thereafter energizes through address line 21c the relay 20.

The opening of contacts 18b again results in the discharge of the capacitor 22 but as before, there is no change in the output of the delay means 56. Upon closure of the contacts 20b, a positive potential is again applied to the capacitor 22 and which thereby develops a positive input pulse to the delay means 56 for production of its negative output for the delay time of about 800 milliseconds. Again the AND gate 187 is blocked by the action of the inverter 56i.

During the time the output conductor 56a of the delay means is negative, the AND gate 51 is partly enabled by the application of that negative potential to the AND gate by way of conductor 51a. The left-hand input is also negative since inverter 52i applies to conductor 52a a negative potential whenever contact 28 is in other than its No. 1 position. Accordingly, negative pulses applied by way of conductor 53 to AND gate 51 produce positive output pulses which developed through OR gate 55 negative input pulses to the amplifier 54. These produce sequential operation of the coil 26 of the stepping switch 25 to move it from its assumed No. 3 position to its No. 1 position. At this time, ground potential through contact 28, conductors 211, 212, inverter 212i, conductors 213, 52, inverter 52i and conductor 52a applies a positive potential to the AND gate 51 to inhibit it and to terminate the stepping of the switch 25. This switch in its homing or No. 1 position connects the lowermost thermocouple of column 12 to the amplifier 17.

After the time interval provided by the delay means 56 expires, its output at conductor 56a changes from negative to ground potential, thus producing a positive output by way of condenser 57 which through OR gate 58 applies a negative input pulse to the amplifier 59. At the same time the AND gate 187 is enabled preparatory to the delivery thereto of subsequent pulses from the delay means 185.

The closure of contacts 60d of relay 60 again initiates the scanning, stepping and conversion operations for the measured variables of column 12.

It will be remembered that the relays 40–43 at the end of each scanning operation by the switching device 61 represent by the positions of their contacts the digits of the binary number whose magnitude is a measure of the magnitude of a measured variable. Accordingly, the lowermost contacts of relays 40–43, when closed, may be taken to represent "ones" and when open will represent "zeros" for the digits in each order of the binary number. More particularly, when the lowermost contact of relay 40 is closed there is connected, from a suitable source of supply, a signal potential shown as $-10$ volts, which is applied by way of conductor 221 to the computer 21. Similarly, from the lowermost contacts of the remaining relays 41–43 there are applied signal potentials representative of "ones" or "zeros" by way of conductors 222–224 to the computer 21. The foregoing represents parallel read-out circuits of the binary numbers and though shown as inputs applied to the computer 21, it is to be understood, of course, that the signals on conductors 221–224 may be utilized for any desired purpose. In some applications it may be preferred to provide serial read-out of the digits comprising each binary number. For that purpose, it will be noted that a connection to the AND gate 71 will provide such a serial output. That AND gate applies its output to conductor 72, and by means of conductor 225 the serial output is fed to the computer 21. Though considered alternative to the parallel read-out, it has been indicated as an input which can be concurrently utilized by the computer 21.

The computer 21 is also supplied with information as to whether each measured variable is above or below its selected value. For this purpose conductors 177 and 178 transmit the output signals from the bistable devices $F_1$ and $F_2$ to the computer 21.

Though the present invention is particularly useful with the computer 21 of the digital type, nevertheless, it has usefulness apart from that computer. As shown, the invention includes features which assure continuance of the operation of the measuring system continually to signal departure of each measured variable from its set value in the event the computer is shut down, disabled, or subject to power failure. To this end, it will be noted that there is associated with the computer 21 a no-voltage relay 226 which, as long as the computer is in operation, maintains its contacts open. When there is failure of the computer, as by loss of power or for any other reason, the relay 226 is deenergized to close its contacts and thereby to complete an energizing circuit from the minus ten volts supply to the operating coil of the relay 23 to move its contacts 23c–23e from their right-most to their leftmost positions. The transfer relay 23 thereby transfers the control of the operating coils of relays 18–20 to a stepping relay 233 which is energized by a self-sequencing arrangement, now to be described.

It will be assumed that the rotatable contact of relay 233 is in its No. 3 position and that the remaining switch devices occupy their illustrated positions. It will be noted that from the contact 28 there is applied a positive or ground potential by way of conductor 212 which produces from the inverter 212i a negative output applied by conductor 213, a capacitor 232, and a diode to apply to an amplifier 234 a pulse for energizing the operating coil of selector switch 233. Accordingly, its movable contact will be operated to its illustrated position to deenergize the coil of relay 20 and to energize the operating coil of relay 18. Upon closure of relay 18, the operations of the system as a whole are initiated as described above. Upon completion of the several operations for each of the thermocouples in column 10, the scanning contact 28 is returned to its No. 1 position, thus again to apply the operating pulse to the amplifier 234 to energize the operating coil of the selector switch 233 to energize the relay 19 to connect column 11 of the condition-responsive devices to their respective amplifiers 13–17. There is then initiated a further sequence of operations. It is to be noted that whenever contact 28 is advanced to its No. 1 position, a pulse is applied to the operating coil to advance switch 233.

The additional features of flexibility already set forth are equally applicable when the system is operating in accordance with its self-sequencing arrangement. Thus, at any time the computer again is to take over, the opening of the circuit to the operating coil of relay 23 by energization of relay 226 will return its contacts to their illustrated position. This places the system under control of the digital computer 21 insofar as selection of the thermocouples or condition-responsive devices may be concerned.

In the above description, the logic circuits or gates referred to as inverters, AND gates and OR gates may be of any one of several designs known to those skilled in the art, providing only that they perform the above-described functions. In a preferred embodiment of the invention, the aforesaid logic circuits or gates were each of the type schematically illustrated in FIG. 6. In FIG. 6 the several input circuits have been labeled A, B, C and D, and the output circuit has been labelled M. If there be provided a single input, then the circuit of FIG. 6 functions as an inverter. It will be assumed that the logic circuit of FIG. 6 has but a single input A and that there is absent any signal to that input, that is, that the input switches 261–263 are each in their illustrated open positions. Nevertheless, current flows from a source 250 shown as a battery of twenty volts by way of a bias supply, shown as a six-volts battery 251, and through resistors 252, 253 and 254 back to battery 250. The junction point 255 is connected to the base b of a transistor 256 of the PNP type, having its emitter e connected to ground potential G by way of conductor 257, while its collector c is connected by way of a resistor 258 to the negative side of the battery 250. Accordingly, the aforesaid flow of current produces a negative bias on the base b relative to the emitter e. Accordingly, the transistor 256 is turned on, that is, made conductive. As a result, the output terminal M is effectively connected through the transistor to the positive terminal of the battery 250. In the absence of an input signal, the output of the system of FIG. 6 is normally positive or at ground potential.

It will now be assumed that the switch 261 is closed to apply to the input terminal A a negative potential, i.e., negative with respect to the ground conductor 257. This negative potential is made ineffective by reason of the inclusion in the input circuit of a diode 259 connected with a polarity to block such an input signal.

Assuming now that a positive input is applied to input circuit A as by closure of switch 262, it will be seen at once that current flows through the diode 259. If that input pulse be of adequate amplitude, it will overcome the negative bias developed at juncture 255, thus rendering the base b positive relative to the emitter e, to turn off the transistor 256. When rendered non-conductive, the output M becomes negative due to its connection by way of resistor 258 to the negative side of the battery 250.

Assuming now that switch 263 is closed to connect ground potential or conductor 257 to input A, it will be seen that a low-resistance path will be completed from battery 250 by way of switch 263, diode 259 and resistor 254 to the other side of the battery 250. The current from battery 250 which previously flowed through resistor 252 will now have shifted to the input circuit. Hence the bias battery 251 will become effective to turn off the transistor 256. The output terminal M is again made negative.

The foregoing operations meet the requirements of an inverter circuit where either a negative input or the absence of an input signal will be considered normal with a resultant positive output.

With the foregoing understanding of the operation the following conclusions may be drawn: the logic circuit of FIG. 6 will always have a positive output with all inputs negative. However, if there then be applied to any one of the inputs ground potential or a positive signal it will be effective in the same manner as described for the inverter to produce a negative output. Thus, if the normal inputs of A–D be negative, the change of any one of them to positive will produce a negative output. Thus, the requirements of an OR gate have been satisfied.

If now it be assumed that all of the inputs of A–D normally be at ground potential or positive the circuit of FIG. 6 will normally have a negative output. That negative output will be maintained until there has been applied to each and all of the inputs negative potentials. The need of the concurrence of negative inputs for a positive output satisfies the requirements of an AND gate.

In a typical embodiment of the circuit of FIG. 6 the transistor 256 was of the PNP type, such, for example, as a 2N–504, while the diodes, unilaterally conductive (non-Zener), were of the type known as Transitron Part. No. S–669G. It is to be understood that a transistor of the NPN type may be utilized with suitable reversals of polarity of the batteries 250 and 251 and the corresponding reversal of connections of the diodes in the input circuits. The polarity requirements and resultant polarities of the output signals will all be reversed from those described for the PNP type of transistor 256. The resistors 252, 253, 254 and 258 will be selected to suit the requirements of the particular transistor utilized and in connection with the voltages of the sources of supply 250 and 251. For the example used in the above description, these resistors may have values of 18,000, 3300, 12,000 and 12,000 ohms, respectively.

It will be remembered that the comparator of FIG. 5, together with the high limit and low limit signal lamps 149 and 152, functioned upon departure of a measured variable from a predetermined value. In many applications of the present invention it will be desirable, particularly in conjunction with control apparatus, to provide a control band and thus to indicate departure of a measured variable from the high and low limits of the band, rather than from a single value. Where such an operation is desired, the system of FIG. 7 may be utilized. As shown, that system is directly applicable to the system of FIGS. 2–4. To show this relationship, it will be seen that pulse generator 62 and the output from amplifier 70 from FIG. 3 both appear in FIG. 7. The comparison amplifier 70 for FIG. 7 applies its output to an inverter 70i. This slight circuit change over the arrangement of FIG. 3 may be preferred and can likewise be utilized in the system of FIG. 3. The plug-in board 105 of FIG. 4 is duplicated in FIG. 7. One of them, a low-limit plug board 105a, has binary numbers selected respectively to correspond with selected low limits for the several condition-responsive devices. Similarly, a high limit plug board 105b has selected binary numbers respectively corresponding with the high limits for the several condition-responsive devices.

The manner in which the system functions upon departure of a measured variable from either a high limit or a low limit will now be explained. The system includes four AND circuits 301–304, three bistable flip-flop devices F3 to F5 and associated inverters 305–308. For convenience, the input conductors have been labelled A, B, C and S, the latter identifying the strobe or pulse circuit from the pulse generator 62.

By reason of the inverter 305 having an input from B, its output will be not B, as will be hereinafter indicated by a bar over the letter B, viz., $\bar{B}$. Similarly, the inverter 306 in input line C provides an output $\bar{C}$, and the inverters 307 and 308 connected to input line A, provide outputs respectively $\bar{A}$.

Assuming now that there is applied from the AND gate 71 a negative pulse on conductor A corresponding with a "one" and that from the plug board 105a on conductor B, the most significant digit is a "zero," then it will be seen that the AND gate 301 will be enabled, insofar as its upper input circuits are concerned, since negative pulses are applied to them. Since negative pulses are generated by the pulse generator 62 for conductor S, the third input to the gate 301 will be negative. Finally, the last input is negative, since the bistable devices F3, F4 and F5, after being reset by means of a pulse delivered by way of a reset line 143, have negative outputs in their respective output conductors 309–311. Accordingly, the resulting positive pulse from the AND gate 301 causes the device F3 to change its state and to produce a negative output which is applied by way of conductor 312 to an amplifier 313 to energize the coil of a relay 314. This relay closes its contacts partially to complete an energizing circuit for the operating coil of the relay 151 provided for the final control element 153. That circiut is not completed until the bistable device F4 changes state to apply through an amplifier 315 an output to energize the coil of a relay 316 to close its contacts 316a. When this occurs the coil of relay 151 of the final control element 153 is energized and so is the high limit signal lamp 152.

The setting of the bistable device F4 depends upon whether there be applied to it a switching pulse from one or other of the AND circuits 302 and 303. It will be seen that AND circuit 302 has a negative pulse applied to its upper input circuit from flip-flop output conductor 312, a negative signal from the A conductor, a negative signal from device F5 by way of conductor 311, and it may be assumed there is a negative input from the conductor S as produced by the pulse generator 62. Accordingly, the AND circuit 302 has been enabled and it will produce a positive output if a negative input be applied by conductor $\bar{C}$. If then it be assumed that the most significant digit as taken from the high limit board 105b is a "0" represented by ground or a positive potential, then the inverter 306 produces a negative pulse on conductor $\bar{C}$.

The significance of the foregoing is that the "one" on conductor A is greater than the "0" from low limit board 105a and is also greater than the "0" from the high limit board 105b. Accordingly, it is known that the measured variable is greater than both the low limit and the high limit and, therefore, the resultant positive pulse from AND gate 302 operates the device F4 from its reset to its set state for application to output amplifier 315 of a negative pulse which energizes the operating coil of relay 316. The resultant closure of its contacts 316a energizes the signal lamp and the final control element 153 through the circuit traced above.

It will be noted that the relay 316 also closes its contacts 316b which partially completes an energizing circuit for the "low" signal lamp 149 and the operating coil of relay 148.

The completion of the foregoing circuits, however, is dependent upon the energization of a relay 317. That relay is energized when the bistable device F5 is operated from its reset to its set state for the production on output amplifier 318 of a negative pulse. For the above assumed conditions, the AND circuit 304 has been inhibited both by a positive pulse applied by way of conductors 310 and 319 at the time the bistable device F4 was operated. The AND circuit 304 was additionally inhibited by the action of the inverter 308 to apply a positive output from the conductor $\bar{A}$, and it may be further observed that AND circuit 304 has applied to it from the high limit board 105b a positive pulse as by way of conductor 320.

There will now be considered the condition where the input to the system of FIG. 7 at input conductor A is positive to represent a digit of "zero." It is immediately obvious that AND circuits 301 and 302 are inhibited by the positive inputs applied to them from conductor A. However, from the conductor A, negative inputs are applied to AND gates 303 and 304 by the conductors respectively labeled $\bar{A}$ and, of course, due to the action of the inverters 307 and 308.

Assuming now that the most significant digit from high limit board 105b is a "one," it will be seen that the resultant negative output will be applied as an input by conductor 320 to AND gate 304. That AND gate has its upper input negative as from the output of of device F4, and its remaining inputs are negative. The one from the inverter 308 has already been described. The remaining input from conductor S is negative. Accordingly, when the generator 62 produces the negative pulse, there is an output from AND gate 304 which produces operation of the bistable device F5 from its reset to its set state. The resultant output as applied to the amplifier 318 energizes the coil of relay 317 partially to complete an energizing circuit for the coil of relay 148 and for the lamp 149.

The foregoing states that the magnitude of the measured variable is less than that set on the high limit board 105b.

If it now be assumed that there is derived from the low limit board 105a a "one," it will be known that the measured condition has a magnitude less than that desired.

The negative potential representative of a "one" from board 105a is applied by conductor B to AND gate 303. This AND gate has applied to its lowermost input a negative potential from bistable device F5, a negative potential by action of the inverter 307, as already described, and a negative potential from the output conductor 309 of device F3. Accordingly, there is a positive output from AND gate 303 which causes the bistable device F4 to be operated from its reset to its set state for production by amplifier 315 of an output for energization of the coil of relay 316. This relay then closes to complete through its contacts 316b the energizing circuits already described to illuminate the signal lamp 149 and to operate the final control element 150 in direction to increase the magnitude of the measured variable.

The operation thus far described illustrates how the final control elements 150 and 153 function in response to departure of the measured variable beyond the high and low limits which define the control range within which that measured variable is to be maintained.

If from the low limit board 105a there had been produced a positive output corresponding with a "zero" on conductor B, it will be seen at once that AND gate 303 would be inhibited to prevent operation of bistable device F4 and to prevent energization of coil 316. Accordingly, the arrangement signals the fact that the measured variable had a magnitude equal to or above that set by the low limit board.

It is to be understood that there will be provided a switching arrangement 161 as shown in FIG. 5 and that the arrangement of FIG. 7 will be duplicated to provide one of them for each of the condition responsive devices. As explained above, some features of the invention may be utilized without others. The comparator of FIG. 5, operative with a single set value for the measured variable, may be used or the system of FIG. 7 which permits control of the measured variable when departing from a selected control band may be preferred. These are exemplary of the variation intended to be covered by the claims appended hereto.

In summary, it will be seen that the thermocouples comprising a plurality of condition-responsive means each produces an output of magnitude corresponding with the analog value of the condition to which it responds. These analog values are converted to numbers in the binary system of magnitude proportional to them. There are also generated binary reference numbers having magnitudes proportional to preselected analog values of said conditions. In conjunction with the foregoing, there is utilized a comparison means which responds to the digits of said numbers in the binary system in their descending order for operating a signaling means. By utilizing the comparison means in the descending order of the digits, less than the total number of digits may be needed (sometimes only the significant digit of each number) to produce operation of the signaling means to indicate departure of each analog value from a selected value or from a selected range of values. The converter 30 functions in conjunction with the binary representation means including the plug-board 105 in generating the binary numbers just mentioned.

What is claimed is:

1. A measuring system comprising
a plurality of amplifiers each having an input circuit and an output circuit,
a plurality of condition-responsive devices greater in number than said number of amplifiers,
first switching means,
first sequencing means for operating said first switching means in sequence to connect one each of a first group and then one each of successive groups of said condition-responsive devices to one each of said input circuits of said amplifiers,
a measuring circuit,
second switching means operable through a cycle to connect said measuring circuit first to one and then to the remainder of said output circuits of said amplifiers, each of said amplifiers having filter means with a relatively long time constant,
second sequencing means for controlling the sequence of operation of said second switching means through its said cycle,
delay means operable from a second state to an initial state after expiration of a predetermined delay time at least equal to said time constant of said filter means,
an energizing circuit for said delay means,
means operable in response to operation of said first switching means to connect said energizing circuit to said delay means to operate it from its initial state to its second state,
means operable in response to the energization of said delay means for preventing the cycling of said second switching means until after the expiration of said delay time of said delay means and return thereof to its said initial state,
an analog-to-digital converter connected to the output of said second switching means comprising a plurality of circuit components, each having two stable states, one representative of a zero and the representative of a one in the binary system and each operable from one to the other of its stable states when the magnitude of the measured variable is greater or less than a predetermined reference magnitude,
means for producing from said circuit components outputs signal representative of said binary zero's and said binary one's,
reference means for generating signals representative of the digits of selected binary numbers,
comparison means, and
third switching means for connecting in sequence to said comparison means said plurality of circuit components and said reference means for production of signals representative of the one's of a selected one of said binary numbers, said comparison means including a signal-generating device for developing an output signal whenever an output from said circuit components exceeds that of said reference means.

2. The measuring system of claim 1 in which there is provided
a computer having address lines forming a part of said first sequencing means,
means responsive to signals applied to said address lines by said computer for predetermining the groups of condition-responsive devices connected to said input circuits,
a control device operatively associated with said computer,
a self-sequencing circuit, and
means responsive to failure of operation of said computer for connecting said self-sequencing circuit to first sequencing means for automatic operation thereof.

3. The measuring system of claim 1 in which the connections from said circuit components and from said reference means to said comparison means apply thereto signals representative of the digits of the respective binary numbers in succession with the digits of greatest order first applied thereto.

4. The measuring system of claim 1 in which said comparison means includes two AND gates each having a plurality of inputs and single outputs, a bistable flip-flop circuit for each AND gate, one of said bistable circuits having its input connected to the output of an AND circuit and having an output circuit connected to the input of the other AND gate, and said last-named AND gate having its output connected to the input of the remaining of said bistable devices, alarm means connected to the output of said last-named bistable device, connections for applying directly to said last-named AND gate the outputs from said converter and from said signal-generating means with corresponding connections therefrom to the other of said AND gates with each of said last-named connections including an inverter.

5. The measuring system of claim 4 in which reset means is provided for said bistable devices operable upon completion of said scanning cycle to reset them to their initial states.

6. A measuring system comprising a plurality of condition-responsive means, binary representation means having a plurality of circuit components selectively operable for the production of a plurality of electrical quantities representative in the binary system of the several digits of a plurality of binary reference numbers of preselected magnitude, comparison means having two inputs for producing output signals of differing character respectively indicative of a condition where a signal applied to one input exceeds the signal applied to the other input and vice versa, means selectively connected to said condition-responsive means for applying to one of said inputs a succession of signals respectively representative of the digits of a number in the binary number system representative of the magnitude of the condition to which said condition-responsive means is responsive, and switching means connected between said binary representation means and the other of said inputs and operable in sequence to apply in succession thereto said electrical quantities representative of a selected one of said binary numbers for producing from said comparison means one or the other of its said output signals.

7. The measuring system of claim 6 in which said means connected to said condition-responsive means is arranged to apply to said one of said inputs said succession of signals with the digits of greatest order first applied to said comparison means and with the digits of lesser order thereafter applied, said switching means being arranged to apply to said other of said inputs said electrical circuits with the digits thereof applied thereto in corresponding descending order.

8. The measuring system of claim 6 in which said comparison means is provided with additional inputs for producing its said output signals of differing character whenever the number in the binary system representative of the magnitude of the condition exceeds upper and lower limits established by a pair of reference numbers corresponding with said upper and lower limits.

9. The measuring system of claim 6 in which said comparison means includes two AND gates each having a plurality of inputs and single outputs, a bistable flip-flop circuit for each AND gate, one of said bistable circuits having its input connected to the output of an AND circuit and having an output circuit connected to the input of the other AND gate, and said last-named AND gate having its output connected to the input of the remaining of said bistable devices, alarm means connected to the output of said last-named bistable device, connections for applying directly to said last-named AND gate the outputs from said converter and from said signal-generating means with corresponding connections therefrom to the other of said AND gates with each of said last-named connections including an inverter.

10. The combination with a measuring system of an analog-to-digital converter including
a plurality of circuits and circuit components for developing a first set of binary numbers of magnitude respectively representative of the magnitude of analog input values applied thereto,
said converter including scanning means having that number of circuit-completing positions corresponding with the number of digits in said first set of binary numbers produced thereby,
a pulse generator,
bistable circuit-controlling means operable to one state for applying to said scanning means pulses from said generator for cyclically completing in succession said circuits of said converter,
means operable after each cycle of operation of said scanning means for returning said bistable means to its initial state,
delay means having a predetermined delay time,
means operable under the control of said scanning means for energizing said delay means after completion of each said cycle of operation,
means including a first AND gate having an input connected to said delay means for controlling the energization of said bistable means to again operate it to its said one state after expiration of the delay time of said delay means,
second delay means having a delay time materially greater than said first-named delay means,
a plurality of condition-responsive devices,
means for developing in succession from said condition-responsive devices analog outputs,
means connecting said outputs to said converter,
means selectively operable as selected condition-responsive devices are connected to said converter for activating said second delay means,
means operable in response to the activation of said second delay means for applying to said first AND gate an inhibiting signal which prevents passage therethrough of said output from said first-named delay means until after expiration of the delay time of said second delay means,
reference means for generating signals representative of digits of a selected second set of binary numbers,
comparison means comprising second and third AND gates each having a plurality of inputs and single outputs,
first and second bistable flip-flop circuits, the output of said second AND gate being connected to the input of said first bistable flip-flop, the output of said third AND gate being connected to the input of said second bistable flip-flop,
means for applying to said second AND gate a first input signal representative of a digit of said first set of binary numbers,
means for inverting said first signal, the output of said last-named means for inverting being applied to said third AND gate,
means for applying to said second AND gate a second input signal representative of the digit of said second set of binary numbers corresponding with the aforementioned digit of said first set of binary numbers, and
means for inverting said second input signal, the output of said last-named means for inverting being applied to said second AND gate for operation of said signaling means whenever said first input signal differs from said second input signal in a selected direction.

11. In a measuring system the combination of binary representation means including circuit components for representation respectively of two binary numbers, one being greater than and one less than a selected number and by predetermined amounts to establish high limits and low limits, an input circuit for developing signals representative of a binary number whose magnitude is proportional to the magnitude of a condition, four AND gates and three bistable devices, one of said input circuits of each of two of said devices being connected to the output circuits of two of said AND gates, said third of said devices having two input circuits each respectively connected to the remaining pair of AND gates, output signal-producing means operative whenever one or the other of selected pairs of said devices has been operated from reset to set states, each pair including as a common element the device having said two input circuits from said two AND gates, an input circuit for applying directly to two of said AND gates and through inverters to the remaining of said AND gates signals representative of said binary number corresponding with the magnitude of said condition, and means for applying directly to one AND gate and through an inverter to another AND gate signals representative of the lower number established by said representation means and directly to one and through an inverter to the other of said remaining pair of AND gates of signals representative of the higher number established by said representation means, whereby said output signal means is energized when said number representative of the magnitude of said condition has values equal to or respectively greater than and less than the numbers established by said representation means.

12. A measuring system comprising a plurality of condition-responsive means each producing an output of magnitude corresponding with the analog value of the condition to which it responds, signaling means having two distinctive states, one for indicating whenever said magnitude exceeds a predetermined value and the other state indicating whenever said magnitude is less than a predetermined value, means including a converter for producing electrical signals representative of the digits of numbers in the binary system of magnitude proportional to said analog output values of said condition-responsive device, means for generating binary reference numbers having magnitudes proportional to preselected analog values of said conditions, comparison means, means for comparing in descending order the digits of said numbers in the binary system for operation of said signaling means, and means responsive to said comparison means for energizing said signaling means whenever the production of one or more of the digits of said numbers indicates departure of said analog values of said conditions from their selected predetermined values.

References Cited by the Examiner

UNITED STATES PATENTS

| | | | |
|---|---|---|---|
| 2,717,994 | 9/1955 | Dickinson | 340—347 |
| 2,754,503 | 7/1956 | Forbes | 340—347 |
| 2,775,754 | 12/1956 | Sink | 340—347 |
| 2,899,567 | 8/1959 | Romano | 340—183 |
| 2,910,667 | 10/1959 | Lubkin | 340—146.2 |
| 2,923,475 | 2/1960 | Ketchledge | 340—146.2 |
| 3,027,079 | 3/1962 | Fletcher et al. | 340—347 |

ROBERT C. BAILEY, *Primary Examiner.*

IRVING L. SRAGOW, MALCOLM A. MORRISON,
*Examiners.*